(12) United States Patent
Rothman et al.

(10) Patent No.: US 8,127,312 B2
(45) Date of Patent: Feb. 28, 2012

(54) BIOS RUNTIME SERVICES INTERFACE

(75) Inventors: Michael A. Rothman, Puyallup, WA (US); Vincent J. Zimmer, Federal Way, WA (US)

(73) Assignee: Intel Corporation, Santa Clara, CA (US)

(*) Notice: Subject to any disclaimer, the term of this patent is extended or adjusted under 35 U.S.C. 154(b) by 1095 days.

(21) Appl. No.: 11/967,137

(22) Filed: Dec. 29, 2007

(65) Prior Publication Data

US 2009/0172712 A1    Jul. 2, 2009

(51) Int. Cl.
  *G06F 9/44* (2006.01)
  *G06F 9/00* (2006.01)
  *H04L 29/06* (2006.01)

(52) U.S. Cl. .............................. 719/328; 713/2; 713/164
(58) Field of Classification Search .............. 713/2, 164; 719/328
See application file for complete search history.

(56) References Cited

U.S. PATENT DOCUMENTS

| | | | |
|---|---|---|---|
| 7,934,085 B2 * | 4/2011 | Azuma et al. ...................... | 713/2 |
| 2005/0144433 A1 * | 6/2005 | Rothman et al. .................. | 713/2 |
| 2005/0204357 A1 * | 9/2005 | Garg et al. ........................ | 718/1 |
| 2007/0174600 A1 * | 7/2007 | Williams et al. .................. | 713/1 |

* cited by examiner

*Primary Examiner* — Charles E Anya
(74) *Attorney, Agent, or Firm* — Cool Patent, P.C.; Joseph P. Curtin

(57) ABSTRACT

A method and article of manufacture for accessing at least one unexposed runtime service.

10 Claims, 3 Drawing Sheets

BIOS RUNTIME SERVICES INTERFACE

BACKGROUND

Computer-system designers implement a firmware resource on computer-system designs that, in a pre-boot environment, initializes a computer system. This firmware resource is known as a basic input output system (BIOS) and may provide services (for instance, simple network connectivity, display output, keyboard input and/or disk drive operation) to a computer system prior to executing an operating-system boot process. The BIOS is generally stored on a non-volatile memory device, such as a flash memory, that is designed or integrated into most computer systems. BIOS may test hardware at start up, start the operating system and support the transfer of data among hardware devices. Conventionally, BIOS is stored in a read only memory (ROM) so that it can be executed when a processor-based system is turned on. For applications running in an operating system, the ability to leverage BIOS system services is limited by what is exposed by the underlying operating system.

DETAILED DESCRIPTION

In the following detailed description, numerous specific details are set forth in order to provide a thorough understanding of claimed subject matter. It will, however, be understood by those skilled in the art that claimed subject matter may be practiced without these specific details. In other instances, well-known methods, procedures, and components have not been described in detail so as not to obscure claimed subject matter.

The terms "basic input/output system" and "BIOS" are used throughout the following disclosure and are intended to refer to the software and/or firmware that executes on a data processing system to perform operations, such as discovering, testing, initializing, providing, configuring hardware and/or providing runtime services. The term "Extensible Firmware Interface" (EFI) and "Unified Extensible Firmware Interface" (UEFI) are used interchangeably throughout the disclosure and are intended to refer to a specification that defines a model for the interface between operating systems and platform firmware. The interface may comprise data tables that contain platform-related information, plus boot and runtime service calls that are available to the operating system (OS) and its loader. The term "Application Programming Interface" (API) is used throughout the following disclosure and is intended to refer to an interface by which an application program may access an OS and other services. The term "runtime service" is used throughout the following description and is intended to refer to basic services and functions (for instance, simple network connectivity, display output, keyboard input and/or disk drive operation) provided by the BIOS. The term "exposed runtime service" is used throughout the following description and is intended to refer to basic services (for instance, simple network connectivity, display output, keyboard input and/or disk drive operation) provided by the BIOS that are accessible via the OS. The term "unexposed runtime service" is used throughout the following description and is intended to refer to basic services (for instance, simple network connectivity, display output, keyboard input and/or disk drive operation) provided by the BIOS that are not accessible via the OS. The term "platform" is used throughout the following disclosure and is intended to refer to a computing system comprising a variety of hardware and software.

Figure 1:
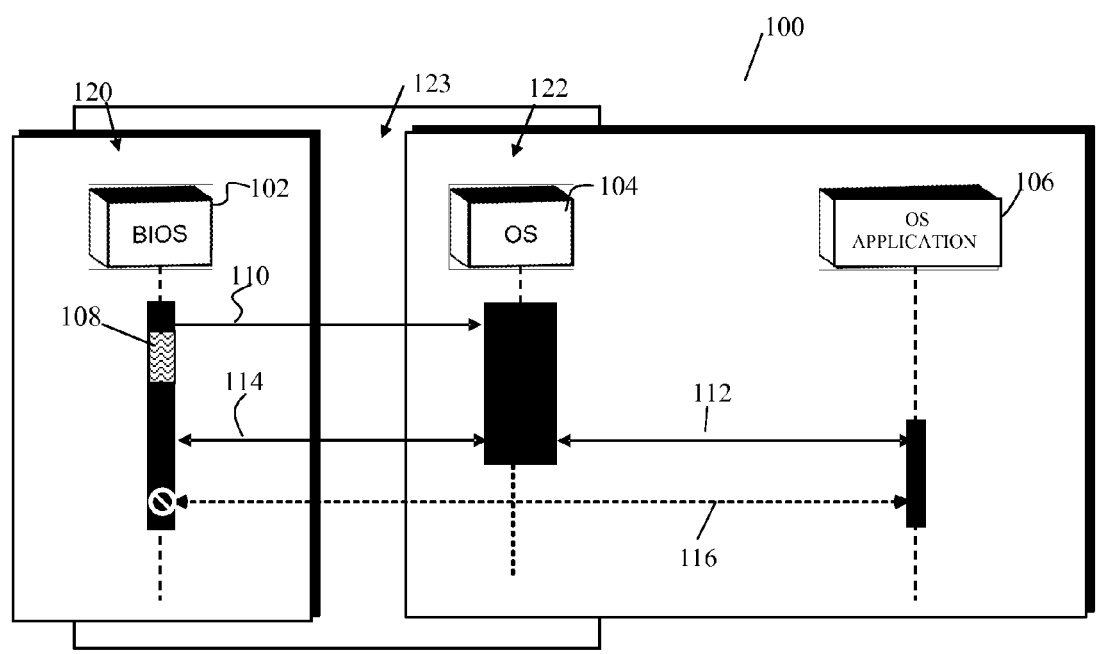
FIG. 1 is a block diagram of a particular embodiment of a processing system for accessing BIOS runtime services.

FIG. 1 illustrates a particular embodiment of a computer system 100 comprising memory device 120, hard disk drive 122 and processor 123. According to a particular embodiment, BIOS 102 may be stored on memory device 120, such as a flash memory, read only memory (ROM), or any other desired type of memory device. According to a particular embodiment, memory device 120 may comprise firmware instructions which when executed by processor 123 perform a variety of operations, such as runtime services, and may launch OS 104. Additionally, OS 104 and OS application 106 may be stored on hard disk drive (HDD) 122. According to a particular embodiment, HDD 122 may comprise instructions which when executed by processor 123 perform a variety of operations, such as running OS 104, OS application 106, and accessing exposed runtime services from BIOS 102. In a particular embodiment, BIOS 102 and OS 104 may be coupled via communication interface 110. Communication interface 110 may comprise a firmware interface such as EFI, and claimed subject matter is not limited in this regard.

In a particular embodiment, BIOS 102 may comprise a variety of runtime services, such as, for instance, underlying platform network services, memory services and/or security services and claimed subject matter is not limited in this regard. In a particular embodiment, for OS application 106 running on OS 104, the ability to access runtime services may be limited to what is exposed via OS 104. In a particular embodiment, platform firmware may provide such runtime services to OS 104 via an established library access mechanism. According to a particular embodiment, one or more exposed runtime services 108 may be communicated to OS 104 through communication interface 114. Communication interface 114 may comprise a firmware communication interface, such as EFI and/or UEFI, and claimed subject matter is not limited in this regard. According to a particular embodiment, exposed runtime services 108 may be communicated to OS application 106, for instance, via communication interface 112. Communications interface 112 may comprise any of a variety of communications interfaces such as, for instance, API, EFI and/or UEFI and claimed subject matter is not limited in this regard. According to a particular embodiment, application 106 may communicate directly with BIOS 102 via communication interface 116. OS application 106 may, however, not be able to access any runtime services directly from BIOS 102. In a particular embodiment, communications interface 116 may comprise any of a variety of communications interfaces such as, for instance, API, EFI and/or UEFI, and claimed subject matter is not limited in this regard.

Figure 2:
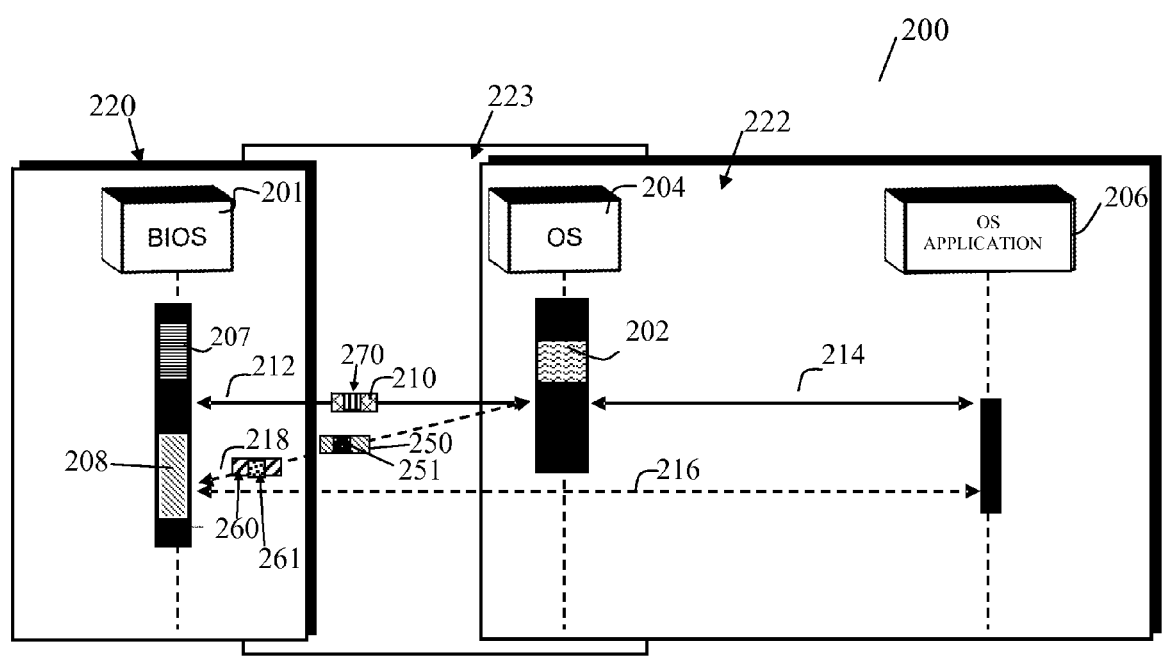
FIG. 2 is a block diagram of a particular embodiment of a processing system for accessing BIOS runtime services.

FIG. 2 illustrates a particular embodiment of computer system 200 for enabling OS application 206 access to runtime services regardless of whether the runtime services are exposed by OS 204. In a particular embodiment computer system 200 may comprise HDD 222, memory device 220 and processor 223. According to a particular embodiment, BIOS 201 may be stored on memory device 220, such as a flash memory, read only memory (ROM), or any other desired type of memory device. According to a particular embodiment, memory device 220 may comprise firmware instructions which when executed by processor 223 perform a variety of operations, such as runtime services, and may launch OS 204. Additionally, OS 204 and OS application 206 may be stored on hard disk drive (HDD) 222. According to a particular embodiment, HDD 222 may comprise instructions which when executed by processor 223 perform a variety of operations, such as running OS 204, OS application 206, and accessing runtime services from BIOS 201.

In a particular embodiment, BIOS 201 may comprise a variety of runtime services, such as, for instance, underlying platform network services, memory services and/or security services and claimed subject matter is not limited in this regard. In a particular embodiment, OS 204 may comprise a library access mechanism for accessing exposed runtime services 208. In a particular embodiment, OS application 206 may comprise runtime services interface 202. In a particular embodiment, runtime services interface 202 may be capable of leveraging such library access mechanism to provide a conduit for accessing unexposed runtime services 207 from platform BIOS 201, even if OS 204 has not provided an access mechanism for such unexposed runtime services 207. In a particular embodiment, runtime services interface 202 may run within OS 204 context and may comprise a process (as described with reference to FIG. 3) for accessing all runtime services available on BIOS 201 regardless of whether the runtime services are available on OS 204 and without requiring OS 204 cooperation. Accordingly, OS application 206 may access exposed runtime services as well as other runtime services available from BIOS 201 via runtime services interface 202.

According to a particular embodiment, application 206 may communicate indirectly with BIOS 201 via OS 204. In another embodiment, OS application 206 may communicate with BIOS 201 directly via communication interface 216. OS application 206 itself may not, however, be able to access any runtime services directly from BIOS 201. In a particular embodiment, runtime services interface 202 may enable unexposed runtime services requests between platform-specific OS application 206 and BIOS 201 via communication channels accessible through OS 204, such as communications interface 212 and/or directly via communications interface 216. Communication interfaces 212 and 216 may comprise any of a variety of communication interfaces, for instance, API, EFI and/or UEFI, and claimed subject matter is not limited in this regard.

In a particular embodiment, runtime services interface 202 may communicate OS application 206 requests for unexposed runtime services 207 to BIOS 201 by leveraging runtime service calls from OS 204 for exposed runtime services 208. In a particular embodiment, runtime services interface 202 may give BIOS 201 directives 270 by providing such directives 270 within the data payload of request call 210 wherein such request 210 is an outbound exposed services request call function sent from OS 204. In a particular embodiment, such directives 270 may trigger a recognition event in BIOS 201 to enable BIOS 201 to parse such directive 270 data from request 210. Such directives 270 may direct BIOS 201 to return a physical parameter address 251 via inbound packet 250 for a specifically requested runtime service and/or return a library access mechanism 261 via inbound packet 260. In a particular embodiment, a trigger may enable the BIOS to recognize request 210 as something that is "special" by a variety of methods, such as, adding a trigger to a variable name and/or a portion of a variable name within request 210 and claimed subject matter is not limited in this regard. Accordingly, in one particular embodiment, passing such directives 270 to BIOS 201 within request 210 may enable OS application 206 to directly access an unexposed runtime service using physical parameter address 251 and/or access exposed runtime services 208 and/or unexposed runtime services 207 using library access mechanism 261.

In a particular embodiment, in which OS application 206 is enabled to access BIOS 201 directly, then such a library access mechanism 260 may be communicated via communication interface 216 and may enable OS application 206 to directly access all available runtime services from BIOS 201. In a particular embodiment, library access mechanism 260 may enable OS application 206 to access unexposed runtime services from BIOS 201 via communications interface 216 by providing a runtime service description sufficient to access alternate or unexposed runtime services from BIOS 201. Such description may comprise a table of functions and pointers. In a particular embodiment, in which OS application 206 communicates with BIOS 201 via OS 204, runtime services interface 202 provides a vehicle 250 for accessing unexposed runtime services 207 via OS 204. Such vehicle 250 may be communicated via communications interface 218. Such communication interface 218 may comprise any of a variety of communication interfaces, such as API, EFI and/or UEFI, and claimed subject matter is not limited in this regard.

Figure 3:
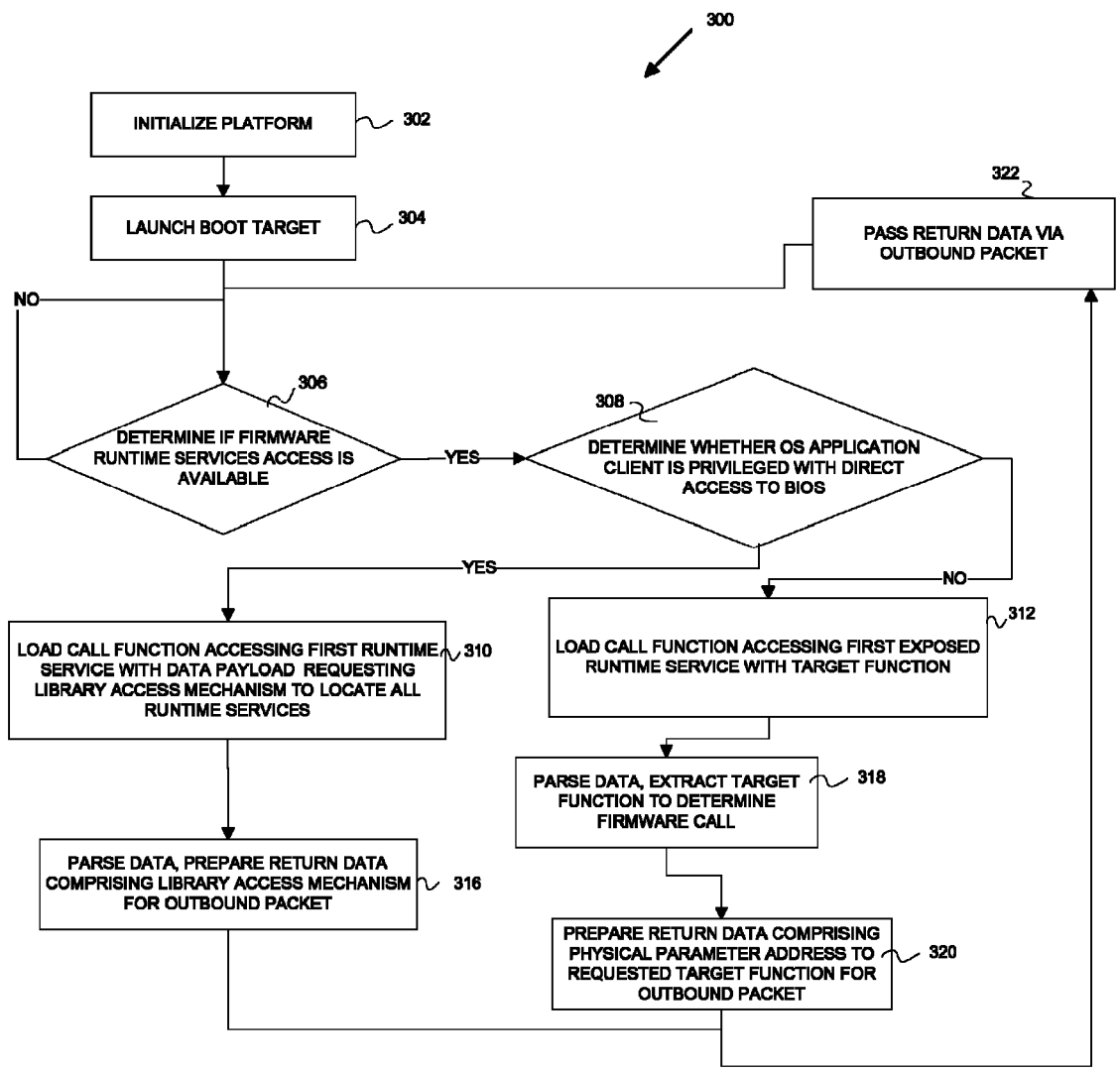
FIG. 3 is a block diagram of a particular embodiment of a process for accessing BIOS runtime services.

FIG. 3 illustrates a particular embodiment of a process 300 for accessing BIOS runtime services regardless of whether the runtime service is accessible via a boot target. In a particular embodiment, process 300 starts at block 302 where a platform may be initialized according to BIOS settings. According to a particular embodiment, process 300 may flow to block 304 where a boot target may be launched. In a particular embodiment, a boot target may comprise any of a variety of computer programs, such as an OS, and claimed subject matter is not limited in this regard. For the purposes of clarity, the boot target will be referred to throughout the remaining description as an OS, however, claimed subject matter is not limited in this regard. In a particular embodiment, there may be a user application running within the OS environment such application is referred to herein as OS application.

In a particular embodiment, at block 306, it may be determined whether there are exposed runtime services available via the OS by issuing a firmware call for exposed runtime services. Such a firmware call may comprise a variable indicator for accessing the first runtime service. In a particular embodiment, if a first runtime service is accessible, process 300 may flow to block 308. At block 308, it may be determined whether the OS application has direct access to the BIOS or whether the OS application communicates with the BIOS via the OS. Such a determination may be made for instance by evaluating a variable name associated with a calling function for accessing exposed runtime services. In a particular embodiment, if the function is a 'get' function, it may indicate that the OS application has direct access to the BIOS.

In a particular embodiment, if the OS application has direct access to the BIOS, process 300 may flow to block 310. At block 310, a request for a library access mechanism may be inserted into the calling function's data payload. For example, such a request may comprise a request for a table of functions and pointers, however, claimed subject matter is not so limited. According to a particular embodiment, process 300 may then flow to block 316 where a calling function may trigger the BIOS to intelligently parse such a request from the calling function. In a particular embodiment, the BIOS may retrieve a library access mechanism and prepare an inbound data packet with return data comprising such a library access mechanism. According to a particular embodiment, process 300 may flow to block 322 where return data may be passed back to the OS application via the OS providing the OS application with information for accessing runtime services without regard to whether they are exposed via the OS.

Returning to block 308, if in a particular embodiment, the OS application communicates with the BIOS via the OS, the process may flow to block 312 where a calling function for accessing an exposed runtime service may be loaded with a request for an unexposed target function. In a particular embodiment, process 300 may then flow to block 318 where the calling function may trigger the BIOS to intelligently parse such a request for unexposed runtime services from the calling function. Process 300 may then flow to block 320 where BIOS may prepare an outbound packet providing physical parameter address for the requested unexposed function. According to a particular embodiment, process 300 may flow to block 322 where return data may be passed back to the OS application via the OS providing the OS application with information for accessing runtime services without regard to whether they are exposed via the OS.

While certain features of claimed subject matter have been illustrated as described herein, many modifications, substitutions, changes and equivalents will now occur to those skilled in the art. It is, therefore, to be understood that the appended claims are intended to cover all such embodiments and changes as fall within the spirit of claimed subject matter.

What is claimed is:

1. A method comprising:
   initializing a processing system according to predetermined basic input/output system (BIOS) settings for the processing system;
   launching a boot target on the processing system;
   launching a platform-specific-platform application to run within the boot target;
   determining whether firmware runtime services is available via the boot target by issuing a firmware call, wherein the firmware call includes a directive comprising:
      a request relating to an exposed runtime service of the BIOS; and
      a trigger capable of initiating a recognition event in the BIOS such that the BIOS recognizes the firmware call as comprising the directive;
   if the firmware runtime services is accessible, determining whether the platform-specific application has direct access to the BIOS or whether the platform-specific application communicates with the BIOS via the boot target, by evaluating a variable name associated with the firmware call;
   if the platform-specific application communicates with the BIOS via the boot target:
      parsing, by the BIOS, the firmware call to retrieve the directive;
      modifying the request related to exposed runtime service to a second request for an unexposed runtime target function; and
      responding, by the BIOS, to the directive by passing return data to the platform-specific application via the boot target.

2. The method of claim 1, wherein launching the boot target comprises launching an operating system.

3. The method of claim 1, wherein the directive comprises a request for a library access mechanism for accessing an unexposed runtime service or a request for the unexposed runtime target function comprising at least one unexposed runtime service, or combinations thereof.

4. The method of claim 3, wherein the request for the library access mechanism is a request for a list of functions and pointers.

5. The method of claim 1, wherein responding to the directive comprises preparing return data comprising a library access mechanism for accessing at least one unexposed runtime service or a physical parameter address for the requested target function comprising at least one unexposed runtime service, or combinations thereof.

6. The method of claim 1, wherein data is communicated through a data structure compatible with: Extensible Firmware Interface (EFI) framework standard or United EFI (UEFI), or combinations thereof.

7. An article of manufacture, comprising:
   a non-transitory machine-readable medium including a plurality of instructions which when executed perform operations comprising:
      initializing a processing system according to predetermined basic input/output system (BIOS) settings for the processing system;
      launching a boot target on the processing system;
      launching a platform-specific-platform application to run within the boot target;
      determining whether firmware runtime services is available via the boot target by issuing a firmware call, wherein the firmware call includes a directive comprising:
         a request relating to an exposed runtime service of the BIOS; and
         a trigger capable of initiating a recognition event in the BIOS such that the BIOS will recognize the firmware call as comprising the directive and respond to the directive;
      if the firmware runtime services is accessible, determining whether the platform-specific application has direct access to the BIOS or whether the platform-specific application communicates with the BIOS via the boot target, by evaluating a variable name associated with the firmware call;
      if the platform-specific application communicates with the BIOS via the boot target:
         parsing, by the BIOS, the firmware call to retrieve the directive;
         modifying the request related to exposed runtime service to a second request for an unexposed runtime target function; and
         responding, by the BIOS, to the directive by passing return data to the platform-specific application via the boot target.

8. The article of manufacture of claim 7, wherein the directive comprises a request for a library access mechanism for accessing a unexposed runtime service or a request for the unexposed runtime target function comprising at least one unexposed runtime service, or combinations thereof.

9. The article of manufacture of claim 8, wherein the request for the library access mechanism comprises is a request for a list of functions and pointers.

10. The article of manufacture of claim 7, wherein data is communicated through a data structure compatible with: Extensible Firmware Interface (EFI) framework standard or United EFI (UEFI), or combinations thereof.

* * * * *